United States Patent
Whittenburg

(10) Patent No.: US 6,663,065 B1
(45) Date of Patent: Dec. 16, 2003

(54) PORTABLE BOOM

(76) Inventor: Franklin Whittenburg, 317 Skylark Trail, Chattanooga, TN (US) 37416

( * ) Notice: Subject to any disclaimer, the term of this patent is extended or adjusted under 35 U.S.C. 154(b) by 0 days.

(21) Appl. No.: 10/173,176

(22) Filed: Jun. 18, 2002

Related U.S. Application Data

(60) Provisional application No. 60/315,730, filed on Aug. 29, 2001.

(51) Int. Cl.[7] ............................................. A47B 96/06
(52) U.S. Cl. ............................ 248/219.1; 248/219.4; 248/230.8; 182/187
(58) Field of Search ................... 248/218.4, 219.1, 248/219.3, 219.4, 227.3, 230.8; 182/187, 188; 254/124, 127

(56) References Cited

U.S. PATENT DOCUMENTS

| | | | |
|---|---|---|---|
| 852,623 A | | 5/1907 | Roth |
| 1,206,574 A | | 11/1916 | Miller |
| 1,535,978 A | * | 4/1925 | Baker .......................... 182/187 |
| 2,308,142 A | * | 1/1943 | Alloway ................... 248/219.1 |
| 2,394,203 A | | 2/1946 | Pruder |
| 3,136,519 A | * | 6/1964 | Spriggle ................... 248/230.8 |
| 3,190,111 A | * | 6/1965 | Trussell et al. ................ 73/600 |
| 3,275,296 A | * | 9/1966 | Meyer .......................... 254/8 R |
| 3,368,725 A | | 2/1968 | Martin |
| 3,885,649 A | | 5/1975 | Damron ...................... 182/187 |
| 4,113,058 A | | 9/1978 | Kobosh ....................... 182/187 |
| 4,124,094 A | | 11/1978 | Cande ......................... 182/187 |
| 4,230,296 A | * | 10/1980 | Staley et al. .............. 248/309.1 |
| 4,427,092 A | * | 1/1984 | Tentler ......................... 182/134 |
| 4,428,459 A | | 1/1984 | Peck ............................ 182/187 |
| 4,458,782 A | * | 7/1984 | Meyer .......................... 182/187 |
| 4,475,627 A | | 10/1984 | Eastridge ..................... 182/187 |
| 4,479,632 A | | 10/1984 | McIntire et al. ............. 254/3 B |
| 4,607,724 A | * | 8/1986 | Hillberg ......................... 182/3 |
| 4,721,183 A | * | 1/1988 | Koniecka ..................... 182/187 |
| 4,730,700 A | | 3/1988 | Miller et al. ................. 182/187 |
| 4,830,143 A | | 5/1989 | Fisher ......................... 182/135 |
| 4,995,475 A | | 2/1991 | Berkbuegler ................. 182/187 |
| 5,016,733 A | | 5/1991 | Bradley ....................... 182/187 |
| 5,199,527 A | | 4/1993 | Jennings ...................... 182/187 |
| 5,261,640 A | | 11/1993 | Yuan ........................... 254/8 B |
| 5,379,861 A | | 1/1995 | Amacker ...................... 182/187 |
| 5,605,315 A | | 2/1997 | Hartung et al. .............. 248/523 |
| 5,632,461 A | * | 5/1997 | von Helms et al. ........ 248/218.4 |
| 5,845,743 A | * | 12/1998 | Dechant ....................... 182/187 |
| 5,897,100 A | | 4/1999 | Napier et al. ................ 254/8 B |
| RE36,276 E | * | 8/1999 | Smith .......................... 182/187 |
| 6,059,240 A | * | 5/2000 | Gorsuch ................... 248/219.4 |
| 6,164,625 A | | 12/2000 | Shockley et al. ............ 254/8 B |
| 6,202,964 B1 | | 3/2001 | Thornhill .................. 248/219.4 |
| 6,264,000 B1 | | 7/2001 | Johnson ....................... 182/136 |

* cited by examiner

Primary Examiner—Korie Chan
(74) Attorney, Agent, or Firm—Alan Ruderman; Stephen J. Stark; Miller & Martin LLP

(57) ABSTRACT

A portable boom for use with a support, such as a tree, has a support extendable from a mound. The mount secures to a tree and supports a lifted weight connected to the support. The portable boom is designed to be portable and easy to connect to the support.

19 Claims, 3 Drawing Sheets

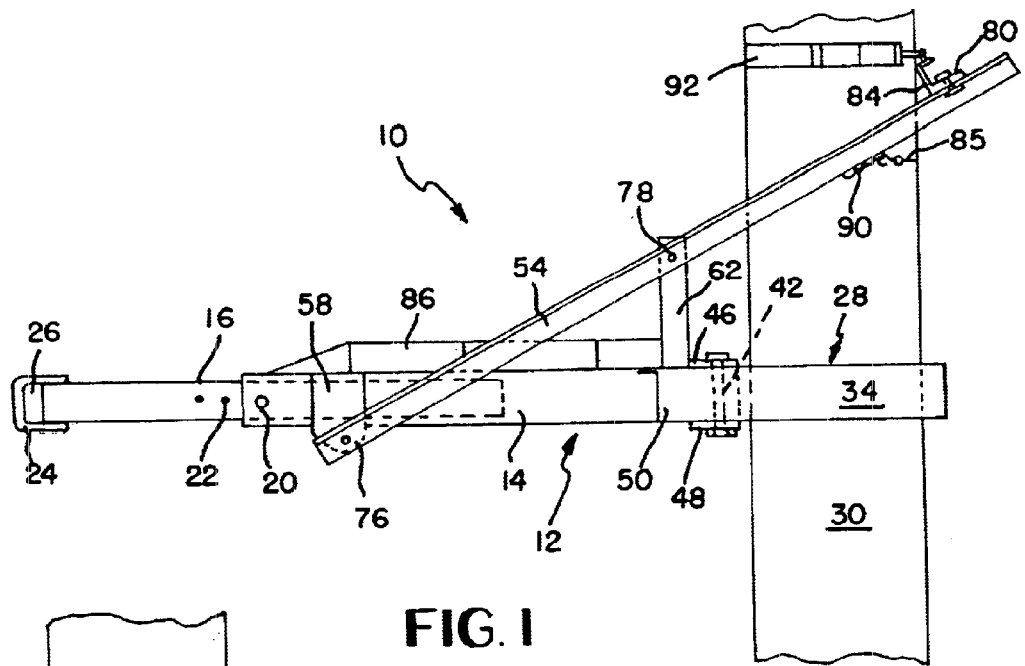
FIG. 1
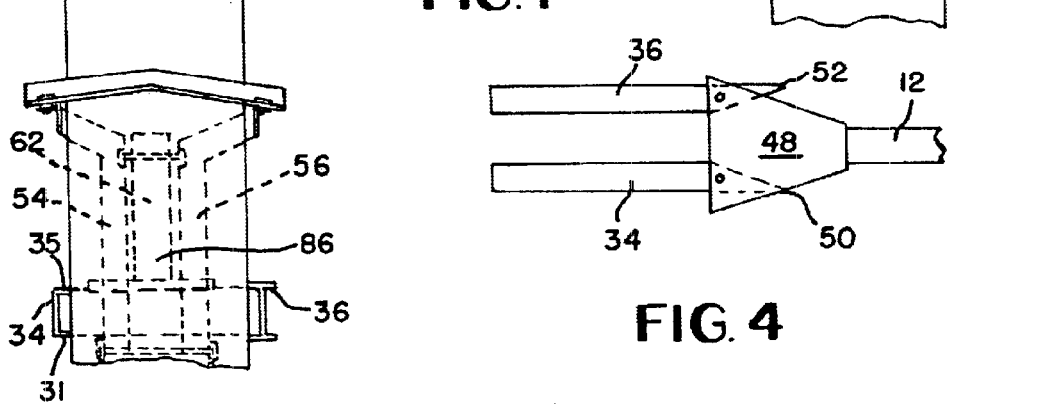
FIG. 2
FIG. 4
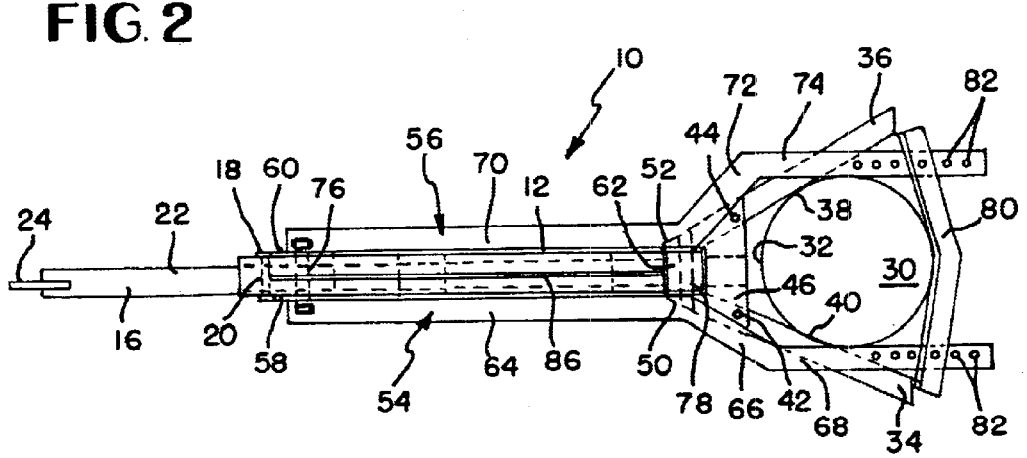
FIG. 3

PORTABLE BOOM

This application claims the benefit of U.S. Provisional Patent Application No. 60/315,730 filed Aug. 29, 2001.

FIELD OF THE INVENTION

The present invention relates generally to a portable boom, and more particularly to a boom adapted to be supported from a vertical upright, such as a tree trunk, such that the boom may lift and/or support suspended weight, such as an engine pulled from an automobile.

BACKGROUND OF THE INVENTION

In order to remove an engine from an automobile, hoists have been developed such as the one provided in U.S. Pat. No. 5,261,640 and others such as U.S. Pat. Nos. 4,479,632, 6,164,625, and 5,897,100. These hoists have a typically have a beam which is mechanically raised and lowered by a mechanical jack. Although this design is effective for many uses, the hoist will not work under a few scenarios.

Specifically, the prior art hoist has a maximum height that the beam can operate. Once the beam is lifted to its maximum elevation, if the engine has not been raised enough to be removed, the operator is stuck and must find an alternative method of removing the engine. Examples of problem scenarios could include (1) removing an inboard engine from a boat with the boat sitting on a tall trailer, or (2) removing an engine from a vehicle where the engine compartment extends a significant distance above the engine. The prior art hoists are also relatively bulky, heavy, take up a significant amount of storage space, are difficult to move from place to place, and are relatively expensive.

U.S. Pat. No. 6,202,964 contemplates hanging objects from a hanger connected to a tree. However, this reference does not appear to be well designed for handling heavy loads. Furthermore this hanger would require the user to climb the tree and then place the strap member at the desired height as the strap member is utilized to hold the connector member against an upright support member, i.e., the tree. There also does not appear to be a way to push this hanger up the tree to a desired position from below or to remove this hanger from the tree without unhooking the strap member.

SUMMARY OF THE INVENTION

A need exists for an improved apparatus for use in supporting and moving heavy objects.

Another need exists for a portable boom which may be utilized to lift objects, such as engines from vehicles, including boats, cars, etc.

A need exists for a portable boom having an adjustable length for ease of storage in compact spaces.

Another need exists for a portable boom which can be utilized on different diameter uprights.

Yet another need exists for a portable boom which may be quickly assembled and utilized by a single operator.

Accordingly a portable boom for use with a vertical upright member, such as a wooden pole or tree, is comprised of an extendable support. The support extends from a channel within a frame. A beam connects a portion of the frame to a retaining member, such as a wedge or chain, which contacts the upright member at a first location, and a stop connects the frame to the upright member at a second location. A post connects another portion of the frame to the beam for stability of the boom. A mount at the end of the support provides a location to locate a lift, chain, or come-a-long to support the weight and/or lift heavy objects. A shoulder such as a flat iron strap along the frame assists in distributing forces along the frame.

The boom may be rotated upwardly at the mount about the wedge which pulls the stop from the extendable support. The boom may then be pushed up, or lowered from the vertical upright without requiring the user to climb the vertical upright to unlatch connections. The beam and the retaining member may be detached to provide a compact profile for storage.

BRIEF DESCRIPTION OF THE DRAWINGS

The particular features and advantages of the invention as well as other objects will become apparent from the following description taken in connection with the accompanying drawings in which:

FIG. 1 shows a side plan view of a first embodiment of the portable boom of the present invention supported by a vertical upright with portions shown in phantom;

FIG. 2 is a back plan view of the portable boom of the embodiment of FIG. 1 supported by a vertical upright with portions shown in phantom;

FIG. 3 is a top plan view of the portable boom of the embodiment of FIG. 1 supported by a vertical upright with portions shown in phantom;

FIG. 4 is a bottom plan view of a portion of the portable boom of the embodiment of FIG. 1 where the frame connects to the stop in a storage position;

DETAILED DESCRIPTION OF THE PREFERRED EMBODIMENT

Figure 5:
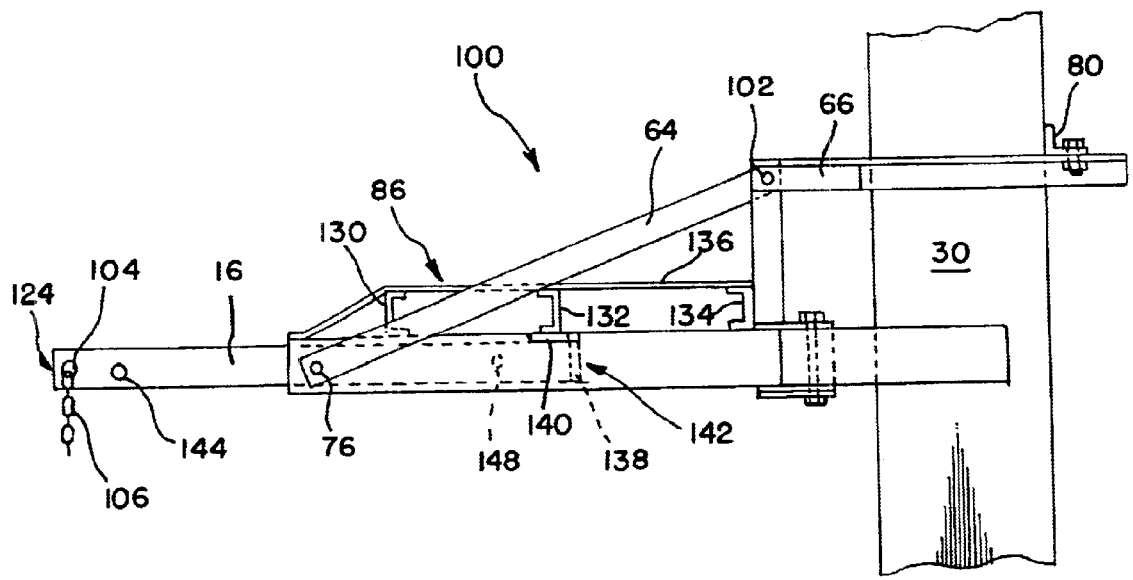
FIG. 5 is a side plan view of a second embodiment of the portable boom of the present invention supported by a vertical upright with portions shown in phantom.

FIGS. 1–4 are directed to a first embodiment of a portable boom 10. FIGS. 1–3 illustrate a portable boom 10 comprised of a frame 12 such as square tube having a tunnel, or channel 14 therein. A support 16 is contained at least partially within the channel 14 and is extendable between a number of extended positions. A pin, or bolt 18, is illustrated extending through a hole 20 in frame 12 and through a bore 22 in the support 16 to secure the support 16 relative to the frame 12. The support 16 is connected to a mount 24. The mount 24 illustrated has an opening 26 which may cooperate with a cable, hook, or other connector so that a lift, hoist, come-a-long or the like, may be suspended from the support 16. Other mounts could support other items such as a basketball goal, or other the like.

The frame 12 is also connected to a stop 28 which contacts a vertical upright 30. The vertical upright 30 is preferably a tree, a wooden post, or the like. The stop 28 may be an abutment, which contacts the vertical upright 30 at a front surface 32 and/or include fork members 34,36 which contact the vertical upright 30 at front or sides 38,40 of the vertical upright 30. The stop 28 may be constructed of channel iron having prongs 35,37 to distribute weight substantially evenly across two surfaces instead of one. An I-beam can also be utilized and it still provides the same two contacting prongs 35,37 as the channel iron as illustrated on the fork member 36 in FIG. 2.

By connecting at the sides 38,40, the fork members 34,36 reduce the likelihood of the stop 28 twisting away from the upright 30 under load. The fork members 38,40 may be rigidly connected to the frame 12, or they may be pivotable, such as to a maximum extended position about fulcrums 42,44 connected by support plates 46,48 to the frame 12. Toes 50,52 of the fork members 34,36 contact the frame 12 to prevent further outward rotation in the preferred embodiment. When the portable boom 10 is not connected to the vertical upright member 30, the fork members 34,36 may be pivoted to substantially parallel with the frame 12 to minimize the space needed for storage as illustrated in FIG. 4.

Referring back to FIGS. 1–3, the frame 12 is connected to first and second beams 54,56 which are utilized to support the weight placed on the support 16. The beams 54,56 connect to the frame 12 at collars 58,60. At least one post 62 also connects the frame 12 to the beams 54,56 to provide rigidity to the portable boom during operation. The beams 54,56, are preferably constructed to have three segments 64,66,68 and 70,72,74, respectively, which include first segment 64,70 which connects the frame support plates illustrated as collars 58,60 to the post 62. First segments 64,70 preferably extend parallel to one another. Second segments 64,72 are angled relative to the first segments 64,70 to space the beams 54,56 a distance away from one another so that third segments 68,74 which are angled relative to second segments 66,72, extend substantially parallel to one another about the vertical upright 30. The beams 54,56 preferably connect to the collars with keeper 76 illustrated as a bolt. The beams 54,56 connect to the post 62 with coupler 78 illustrated as a bolt. The post 62 may be welded or otherwise connected to the frame 12. The keeper 76 and the coupler 78 may be removed to at least partially disassemble the portable boom 10 for storage, if so desired.

A wedge 80 connects the first and second beams 54,56 at a docking station 82. Preferably, a plurality of docking stations 82 are provided which allow the boom 10 to be utilized on a variety of uprights 30 of various diameters. The multiple docking stations 82 can also be utilized to adjust the angle of the support 16 relative to the vertical upright 30. The wedge 80 may be constructed of bent angle iron which provides an edge 84 for digging into certain uprights 30, such as trees.

In order to locate the boom 10 on an upright 30, the boom 10 is preferably assembled except for locating the wedge 80 in a docking station 82. The beams 54,56 are placed about the upright 30 and the stop 28 is placed proximate to the upright 30 as well. Depending on the desired angle of the support 16 relative to the upright 30, a cable 85 may be utilized. Cable 85 has clips 88 on either end which may be clipped with one hand by a user. The cable 85 temporarily holds the boom 10 at a desired angle relative to the upright 30. If satisfied with the angle, the particular docking station 82 may be selected and the wedge 80 secured to the beams 54,56. A plurality of loops 90 are provided for attachment locations for the clips for the user to select the desired angle.

The boom 10 can now be moved to a desired altitude relative to the vertical upright 30. It can be seen from the Figures that rotation of the boom 10 upwardly by lifting up at the support 16, or other appropriate position, and rotating about the wedge 80 will pull the stop 28 away from the upright 30. The wedge 80 can then be pulled from the upright 30 and the boom 10 pushed up, or pulled up, to a desired elevation on the upright 30. Of course, the boom 10, may be lowered utilizing this same technique. Once at the desired altitude, the boom 10 is then rotated downwardly and the stop 28 and wedge 80 will then contact the upright 30 to hold the boom 10 in position. A safety strap 92 may be connected to the wedge 80, such as at finger 84 or otherwise, once in a desired elevation.

With the boom 10 at the desired elevation, which is not limited by the boom 10, but by the vertical upright 30, the support 16 may be extended to the desired position relative to the frame 12, if not done before raising the boom 10 to the desired elevation. The mount 24 may then be utilized to lift and/or support the weight of an object, such as an engine.

With a weight supported from the mount 24, a downward force is applied at the mount 24. An upward force is then applied at the keeper 76 where the beams 54,56 connect to the collars 58,60. The beams 54,56 also impart a longitudinal force to the frame due to their angular relationship. This longitudinal force is counteracted by the force of the stop 28 against the upright 30. The wedge 80 experiences similar forces as the beams 54,56 and is counteracted by the contact with the upright 30. When the boom 10 is under load, the shoulder 86 located atop the frame 12 has been found helpful in distributing the load imparted at the collars 58,60 about the frame 12. The shoulder 86 may be constructed of adjacent angle iron as shown in FIGS. 2 and 3, or channel iron supporting strapping thereon, which, as shown in FIG. 1, resembles the rib on top of a shotgun.

When the boom 10 is not in use, it may be left suspended by the upright 30, or it may be lowered and at least partially disassembled for storage. The boom 10 may be utilized with various upright cross sections and sizes.

The frame 14, and post 62, may be constructed of square stock steel having a channel 14 therein. The support 16 may be of similar square stock steel having smaller dimensions than the frame 14. The shoulder 86, the beams 54,56 and the wedge 80 may be constructed from angle iron and bent into the desired configuration, if necessary. The fork members 34,36 may be channel iron or I-beam as illustrated. Although iron and steel is discussed, other building materials could also be utilized including aluminum, titanium, steel alloys or other appropriate material.

Although the embodiment of FIG. 1 works satisfactorily, the embodiment of FIG. 5 is also a satisfactory design. FIG. 5 shows a boom 100 which is substantially similar to the boom 10 of FIGS. 1–4 except that the beams 54,56 are no longer constructed of a single member as illustrated. Pivot 102 is illustrated connecting first beam segment 64 with second beam segment 66. A bolt may provide a satisfactory pivot 102. Of course, while only one pivot 102 is illustrated, a corresponding pivot would exist for beam 56 which would likely be provided by the same bolt.

By providing pivots 102, the wedge 80 will not tend to dig into the surface of the upright 30. Additionally, the force distribution has been found advantageous through this arrangement, and the boom 100 is believed to be user friendly in terms of installation onto the upright 30.

The mount 124 has been simplified from the preferred embodiment and may comprise a bore 104 through the support 16. A length of chain 106 may be attached through the bore 104. Alternatively, two flat strips of metal forming a shackle can be attached at bore 104 to provide a mount 124. Other mounts 124 are also known in the art. Finally, the shoulder 86 has been modified to be comprised of spaced pillars 130,132,134 supporting a ridge 136. This construction has been found to provide adequate strength while significantly reducing the weight of the shoulder 86.

Figure 8:
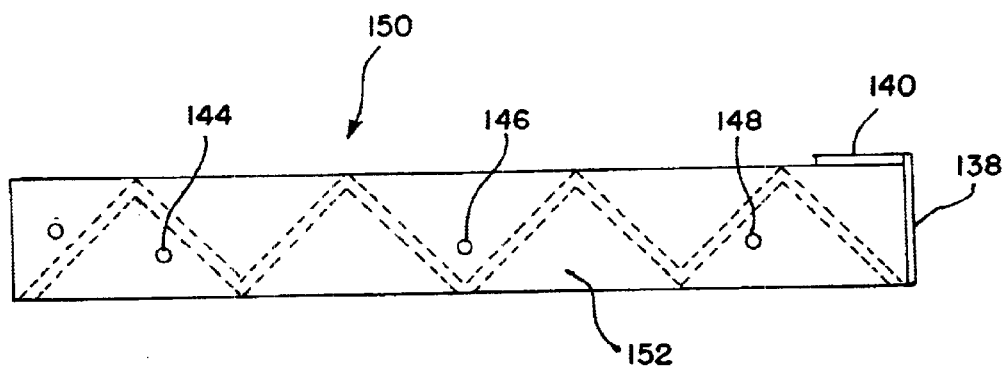
FIG. 8 is a cross sectional view of a portion of the support of the portable boom of FIG. 6.

Also, the support 16 has a cap 138 and a rest 140 at a distal end 142 of the support 16. The rest 140 preferably corresponds with the pillars 130,132,134 as illustrated when holes 144,146,148 illustrated in FIG. 8 are aligned with keeper 76. The cap 138 and rest 140 are believed to provide rigidity to the support 16. The rest 140 is believed to assist in the distribution of forces to the top of the support 16 to assist in preventing a loaded support 16 from digging into the frame 12, especially when located under the pillars 130,132,134.

An alternative embodiment of the support 16 is illustrated in FIG. 8 as support 150. This embodiment has an internal stress member 152 which is believed to assist in distributing stresses and forces about the support 150 while allowing the support 150 to be constructed of lighter weight materials while supporting relatively heavy loads without failure, and preferably without significant bending. The stress member 152 may be spot welded in place relative to an exterior square tube member 152.

Figure 6:
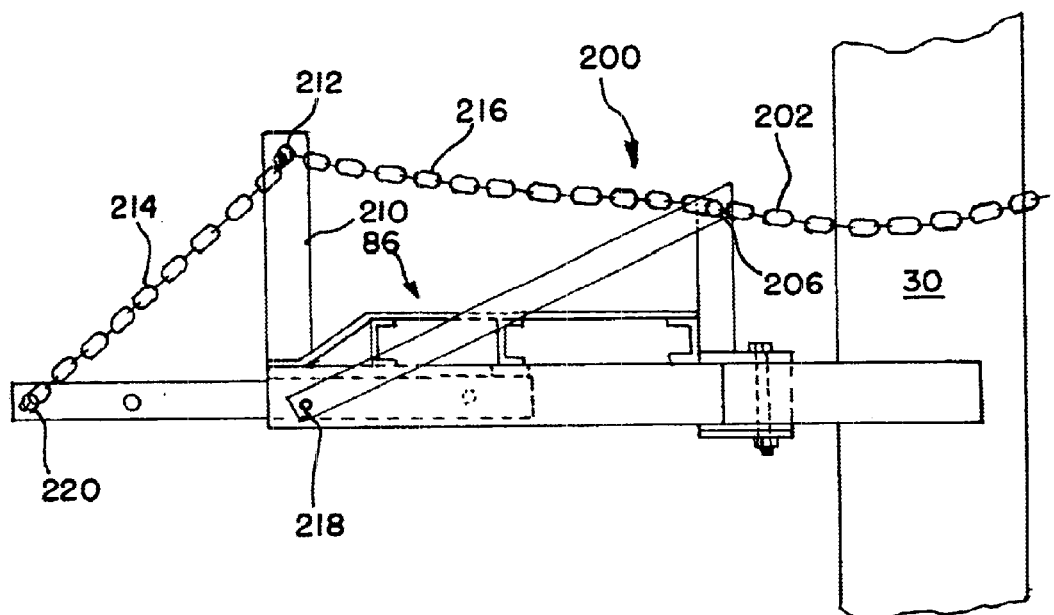
FIG. 6 is a side plan view of a third embodiment of the portable boom of the present invention supported by a vertical upright with portions shown in phantom.
Figure 7:
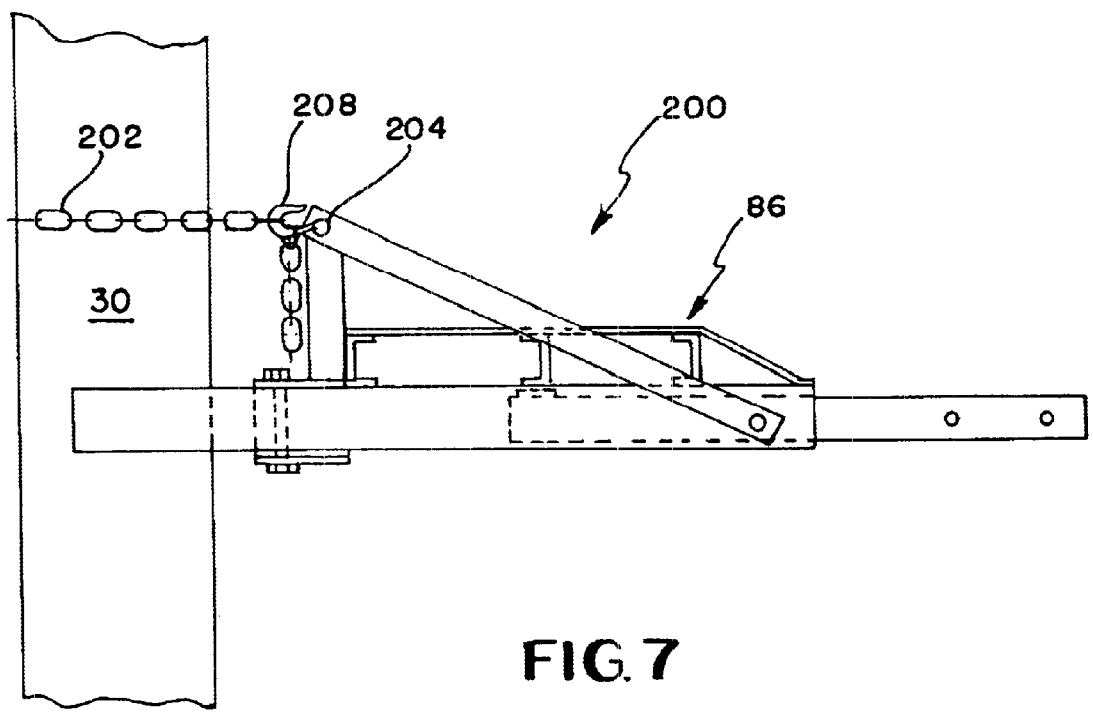
FIG. 7 is a side plan view of a fourth embodiment of the portable boom supported by a vertical upright with portions shown in phantom.

The third and fourth embodiments of FIGS. 6 and 7 have a similar mount 124 as the second preferred embodiment of FIG. 5. Notice that the chain 106 utilized with the mount 124 has been removed, and may not be necessary in all embodiments. FIG. 7 shows the presently preferred embodiment of the invention.

The largest difference between the third and fourth embodiments of the booms 200 of FIGS. 6 and 7 and the embodiment of FIG. 5 is the use of a chain 202 for a retaining member instead of beams 54,56 and wedge 80. The chain 202 is retained by a bolt 204 (which may be similar to the bolt utilized for pivots in the second embodiment) and/or a nut 206 in a connected position. Once the chain 202 is looped around the upright 30, it may be connected to an eye-grab hook 208, such as one adapted to work with chain. In this manner, the boom 200 is particularly well adapted to work with almost any sized upright 30 with an appropriate amount of chain 202.

Additionally, since the beams 54,56 are reduced to a single segment 64 which does not transfer forces to a wedge, bar stock has been found adequate to form the beams 54,56 in the boom 200. Of course, in both the second and third embodiments, shoulder 86 is illustrated as being comprised of channel iron supporting strapping thereon as explained for FIG. 5 above.

In the third embodiment of FIG. 6, an optional extension 210 connected to the frame 12 is utilized. This extension provides a connector 212 for connecting links 214,216 which may, or may not be chain members as illustrated. The extension 210 connects at bolt 218 and may pivot about bolt 218 in some embodiments. The links 214,216 connect connector 212 to mount 220 and bolt 206 which is believed to assist in relieving at least some vertical load stress off of the support 16.

Numerous alternations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A portable boom for use with a wooden upright, said boom comprising:

a frame extending from a proximal to a distal end and having a channel therein;

a support having a proximal end and a distal end, and said support extending from within the channel of the frame and having a mount thereon, said support locatable a plurality of positions within the channel to position the proximal end of the support at a plurality of distances from the distal end of the frame;

a stop movably connected to a distal end of the frame, said stop configured to contact the wooden upright in an installed configuration;

an arm connected to the frame and extending a distance above the frame at the distal end of the frame;

a beam connecting a top portion of the arm to a proximal portion of the frame;

a shoulder extending substantially the length of the frame along a top of the frame; and a retaining member connecting an upper portion of the arm to the wooden upright in the installed configuration wherein the upper portion of the arm is located above the stop and the retaining member extends from the arm about the wooden upright and back to the arm and the arm spaced from the wooden upright, wherein movement of the stop upward and away from the wooden upright rotates the top portion of the arm toward the wooden upright thereby loosening the retaining member allowing adjustment of the elevation of the portable boom relative to the wooden upright.

2. The portable boom of claim 1 wherein the stop is comprised of fork members which oppose one another about the frame.

3. The portable boom of claim 2 wherein fork members rotate from an extended to a storage configuration.

4. The portable boom of claim 1 wherein the mount is proximate to the proximal end of the support.

5. The portable boom of claim 1 further comprising an extension connected to the proximal end of the frame and extending a distance above the frame, said extension having a top portion connected to the top portion of the arm by a first link and said top portion of the extension connected by a second link to the mount.

6. The portable boom of claim 1 wherein the shoulder further comprises spaced apart pillars and a ridge spanning the spaced apart pillars, and the distal end of the support is located proximate to the pillars when in the plurality of positions.

7. The portable boom of claim 6 further comprising a resting pad connected to a top portion of the distal end of the support, said resting pad located below the pillars when in the plurality of positions.

8. The portable boom of claim 1 further comprising a cap at the distal end of the support.

9. The portable boom of claim 1 wherein the retaining member is a chain.

10. The portable boom of claim 1 wherein the support is connected to the frame where the beam connects to the frame.

11. A portable boom comprising:

a frame extending from a proximal end to a distal end;

a stop located at the distal end of the frame;

an arm extending upwardly from the distal end of the frame;

a beam connecting an upper portion of the arm with the proximal end of the frame; and a retaining member connected to the arm;

a support extending from the proximal end of the frame, said support having an internal stress member extending from a proximal end to a distal end of the support with the internal stress member located within the support and connected to the support.

12. The portable boom of claim 11 further comprising a shoulder connected to a top portion of the frame extending intermediate the arm and the proximal end of the frame.

13. The portable boom of claim 11 wherein said stop has opposing fork members rotatable from a storage to an extended configuration, wherein the fork members parallel the frame in the storage configuration and are angled relative to the frame in an extended configuration.

14. The portable boom of claim 13 wherein the support has a mount thereon.

15. The portable boom of claim 14 wherein the mount is located at a proximal end of the support.

16. The portable boom of claim 13 wherein the frame has a channel therein and the support is positionable at a plurality of spaced apart positions within the channel.

17. The portable boom of claim 16 further comprising a resting pad at a top portion of the distal end of the support.

18. A portable boom comprising:
- a frame extending from a proximal end to a distal end;
- a stop located at the distal end of the frame, said stop having opposing fork members rotatable from a storage to an extended configuration, wherein the fork members parallel the frame in the storage configuration and are angled relative to the frame in an extended configuration;
- an arm extending upwardly from the distal end of the frame;
- a beam connecting an upper portion of the arm with the proximal end of the frame;
- a retaining member connected to the arm;
- a support extending from the proximal end of the frame;
- said frame having a channel therein and the support is positional at a plurality of spaced apart positions within the channel;
- a resting pad at the top portion of a distal end of the support; and
- a shoulder connected to the top of the frame having a plurality of pillars supporting a ridge, and wherein the support has a plurality of bores therethrough and a distance intermediate the bores is equivalent to a distance intermediate the pillars; wherein the resting pad aligns below one of the plurality of pillars when the support is secured to the frame.

19. The portable boom of claim 11 wherein the retaining member is a chain.

* * * * *

UNITED STATES PATENT AND TRADEMARK OFFICE
CERTIFICATE OF CORRECTION

PATENT NO.    : 6,663,065 B1
DATED         : December 16, 2003
INVENTOR(S)   : Franklin Whittenburg It is certified that error appears in the above-identified patent and that said Letters Patent is hereby corrected as shown below:

Title page,
Item [75], Inventors, the inventor's address is -- 3715 Skylark Trail --, not "317 Skylark Trail".
Item [57], ABSTRACT,
Line 1, should be -- A portable boom for use with a support, such as a tree, has a support extendable from a mount. --

Column 3,
Lines 1 and 4, should be -- prongs 35,31 -- instead of "prongs 35,37";
Line 8, should be -- fork members 34,36 -- instead of "form members 38,40"; and
Lines 28-29, should be -- second segments 66,72 -- instead of "second segments 64,72".

Signed and Sealed this

Twenty-third Day of March, 2004

JON W. DUDAS
*Acting Director of the United States Patent and Trademark Office*